United States Patent
Kiedrowski

(10) Patent No.: US 9,477,075 B2
(45) Date of Patent: Oct. 25, 2016

(54) RIGID ENDOSCOPE

(71) Applicant: OLYMPUS WINTER & IBE GMBH, Hamburg (DE)

(72) Inventor: Gregor Kiedrowski, Hamburg (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 0 days.

(21) Appl. No.: 14/780,823

(22) PCT Filed: Jan. 20, 2014

(86) PCT No.: PCT/EP2014/000135
§ 371 (c)(1),
(2) Date: Sep. 28, 2015

(87) PCT Pub. No.: WO2014/154311
PCT Pub. Date: Oct. 2, 2014

(65) Prior Publication Data
US 2016/0054557 A1    Feb. 25, 2016

(30) Foreign Application Priority Data

Mar. 27, 2013    (DE) .................. 10 2013 005 216

(51) Int. Cl.
*G02B 7/00* (2006.01)
*G02B 23/24* (2006.01)
*G02B 23/26* (2006.01)

(52) U.S. Cl.
CPC ....... *G02B 23/2423* (2013.01); *G02B 23/2476* (2013.01); *G02B 23/26* (2013.01)

(58) Field of Classification Search
CPC   A61B 1/00096; A61B 1/07; A61B 1/00135; A61B 1/042; A61B 1/00142; A61B 1/00195; G02B 23/26; G02B 23/2476; G02B 6/3624; G02B 6/4428

USPC .................. 359/503; 600/182, 130
See application file for complete search history.

(56) References Cited

U.S. PATENT DOCUMENTS 5,253,321 A    10/1993  Long et al.
5,577,992 A    11/1996  Chiba et al.
(Continued)

FOREIGN PATENT DOCUMENTS

| DE | 4435644 A1 | 4/1995 |
| DE | 19742454 A1 | 4/1999 |
| DE | 102004009219 A1 | 9/2005 |
| JP | H03-081716 A | 4/1991 |

OTHER PUBLICATIONS

International Search Report dated Jun. 13, 2014 issued in PCT/EP2014/000135.
(Continued)

*Primary Examiner* — Euncha Cherry
(74) *Attorney, Agent, or Firm* — Scully, Scott, Murphy & Presser, PC

(57) ABSTRACT

A rigid endoscope including: a fiber tube; a window disposed at a the distal end of the fiber tube; an objective lens arranged in the fiber tube; a spacer tube to maintain the objective lens at a predetermined-distance from the window; and an objective lens tube for holding the objective lens, the objective lens tube being disposed in the fiber tube between the window and at least a portion of the spacer tube; wherein the spacer tube is supported on a distal end against the window and on a proximal end against the objective lens.

4 Claims, 2 Drawing Sheets

(56) References Cited

U.S. PATENT DOCUMENTS

| | | | |
|---|---|---|---|
| 5,630,795 A | 5/1997 | Kuramoto et al. | |
| 2002/0128535 A1 | 9/2002 | Kikuchi et al. | |
| 2005/0192479 A1* | 9/2005 | Forster ............... | A61B 1/00195 600/182 |
| 2012/0253129 A1 | 10/2012 | Kitano | |

OTHER PUBLICATIONS

English translation of International Preliminary Report on Patentability dated Sep. 29, 2015 together with the Written Opinion received in related International Application No. PCT/EP2014/000135.

* cited by examiner

RIGID ENDOSCOPE

CROSS-REFERENCE TO RELATED APPLICATION

The present application is based upon and claims the benefit of priority from PCT/EP2014/000135 filed on Jan. 20, 2014, which claims benefit to DE 10 2013 005 216.5 filed on Mar. 27, 2013, the entire contents of each of which are incorporated herein by reference.

BACKGROUND

1. Field

The present disclosure generally relates to endoscopes, and more particularly to a rigid endoscope.

2. Prior Art

An endoscope of this type is known from DE 10 2004 009 219 A1. The objective lens is held by a spacer device at a distance from the window, by which means the precise optical calibration of the objective lens is assured.

In the known structure, the objective lens is supported against a stop on the fiber tube formed by a step protruding inward. Thus, a precise preservation of the distance of the objective lens with regard to the window fixed on the fiber tube is possible. However, disadvantages arise from this structure.

Due to the projection protruding inward, a diameter reduction of the fiber tube arises. This results in an increase of the tolerances during the assembly of the window. This window must be held during the fixing of the fiber tube, which e.g. usually takes place by soldering. For this purpose, in general a mandrel is used which is pushed forward from the inside through the fiber tube up to the window, which mandrel supports the window on a plurality of points or in a planar way and holds it during the soldering. The projection forming the stop reduces the inner diameter of the fiber tube at this point so that the diameter of the mandrel that is able to be fed through must be reduced. The support surface of the mandrel is thus reduced at the window and by this means the calibration precision. This can lead to interfering tiltings of the window.

A further disadvantage of the step forming the stop is an impaired cleanability in this area. In this case, e.g. soldering flux residue remaining in the corner, could offgas in the later hermetically closed fiber tube and blur the optical surfaces of the objective lens due to fogging.

In the region between the window and the objective lens, an additionally previously unsolved problem persists, which results from the fixing of the window. The window is soldered in the usual way on its peripheral edge to the inner surface of the fiber tube. For this purpose, a preparation of the surfaces to be soldered is necessary. The glass of the window must be metallized on the edge, but also an inner gold plating of the fiber tube is advantageous in order to guarantee a truly secure fixing. Thereby, it is in turn commendable for a number of mostly manufacturing-caused reasons, to allow this gold plating to project over the region to be soldered in the proximal direction. Also, the metal solder used for soldering is allowed to swell out of the solder gap in the proximal direction for a number of reasons.

After completing the soldering of the window, highly reflecting surface regions thus result from the gold plating and/or the soldering on the inner side of the fiber tube in the region between the window and the objective lens, which result in interfering reflections which can radiate from the sides into the beam path and to the eye of the observer.

SUMMARY

An object consists in improving the optical features of the endoscope.

Accordingly, a direct support is carried out between the objective lens and window by a spacer tube arranged therebetween, which is supported directly against the window and against the objective lens. On the one hand, this is a very simple solution which can also be mounted very easily e.g. by stacking. On the other hand, the landing on the inner side of the fiber tube is omitted by this solution. The diameter reduction caused by this thus is also omitted. The calibrating mandrel for the window may be expanded in diameter so that a more precise mounting of the window is possible. Likewise, disadvantages regarding cleaning in the region of the stop edge are also omitted. Finally, the spacer tube is suited for the purpose of potentially covering reflective surface areas seated on the inner side of the fiber tube so that interfering reflections are prevented.

According to claim 2, the object lens can be arranged in an objective lens tube which is usable for mounting and supporting the objective lens.

The spacer tube may be designed separately from the objective lens; however, according to claim 3 can be fixed on the same, by which means the assembly is further simplified, in particular if, according to claim 4, the spacer tube is designed integrally with the objective lens tube.

The spacer tube may be designed e.g. as a grid construction or the like; however, according to claim 5, can be impermeable to light, thus, e.g. as a smooth, straight tube. By this means, an optimal effect as a shield tube which blocks out lateral reflections.

BRIEF DESCRIPTION OF THE DRAWINGS

In the drawings, the invention is represented by way of example and schematically.

DETAILED DESCRIPTION

Figure 1:
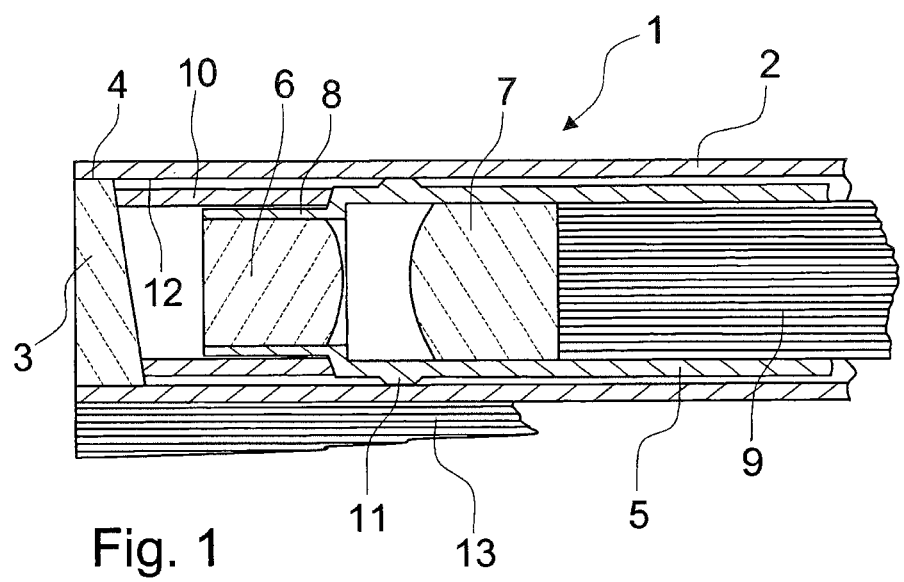
FIG. 1 illustrates an axial cross section through the distal end region of an endoscope.

FIG. 1 shows an axial cross section through the distal end region of an endoscope 1. This is a rigid endoscope. The tube structures represented may thus consist of hard plastic or in particular of metal. An outer housing tube, working channels, and the like are omitted for graphic simplification. Visible is a fiber tube 2 which accommodates the image transporting optical system. To protect the optical elements, fiber tube 2 is sealed closed. At the distal end, a window 3 is used for this purpose, which is soldered at its edge surface 4 into the inner surface of fiber tube 2. In the represented embodiment, window 3 is designed as a wedge-shaped window. It may, however, as is shown with window 3' in FIG. 2, also be designed as a planar window.

At a distance from window 3, an objective lens tube 5 is arranged in fiber tube 2, in which objective lens tube an objective lens is fixed, which in the represented embodiment consists of two lenses 6 and 7. Lens 6 sits distally in front of lens 7 and has a smaller diameter. Correspondingly, objective lens tube 5 is also designed at its distal end region 8 with a smaller diameter.

The image must be forwarded proximally from objective lens 6, 7. For this purpose, various image guides, e.g. a relay lens system, may be used, or an electronic image sensor may be arranged directly behind proximal lens 7 of the objective lens. In the represented embodiment, however, a fiber image guide 9 is provided, which consists of a large number of parallel glass fibers, by means of which the image is transported in the proximal direction from objective lenses 6, 7.

Objective lens tube 5 may be designed as relatively short, only in the region of objective lens 6, 7, or, as represented, may extend across the length of fiber image guide 9.

To guarantee optimal optical characteristics, objective lenses 6, 7 must be fixedly calibrated in endoscope 1, namely in particular with regard to the distance from window 3. The invention provides for this purpose a spacer device in the form of a spacer tube designed as a shield tube 10, which, as shown in FIG. 1, is supported at its distal end against window 3 and at its proximal end against the landing, at which objective lens tube 5 transitions to its reduced-diameter distal end part 8. In this way, the objective lens is supported against window 3. From the proximal end of fiber image guide 9 or of objective lens tube 5, the secure disposition of objective lens tube 5 on shield tube 10, as well as the latter's disposition on window 3, may be ensured e.g. by means of spring application.

For radial positional stability of the objective lens, a projection on the outer side of objective lens tube 5 may be provided which, e.g. as represented, may be designed as a circumferential flange.

Shield tube 10 is designed as non-perforated, thus it prevents lateral irradiations which arise due to reflecting surface areas, if applicable, present on the inner surface 12 of fiber tube 2 close to window 3. Shield tube 10 may effectively block out these reflections and does not function reflectively itself because it is mounted cleanly after the completed soldering process and is unloaded by the soldering process.

FIG. 1 shows at a point outside of fiber tube 2 optical fibers 13, which are connected proximally to a light source (not shown) and radiate light at their distal front faces on the observation area. Optical fibers 13 may also be omitted in specific designs. Additional structure elements connected outside on fiber tube 2, such as e.g. a working channel, outer tube structures and the like, are omitted for graphic simplification.

Figure 2:
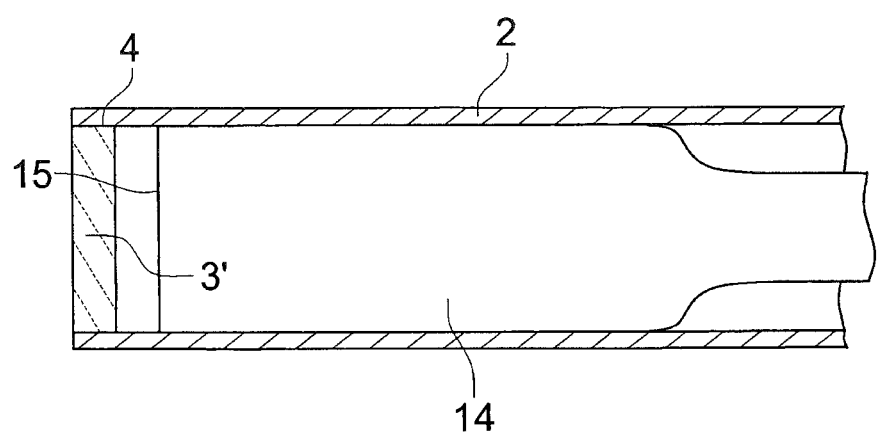
FIG. 2 illustrates a cross section from FIG. 1 in an embodiment variant of the window, during the mounting thereof.

FIG. 2 shows fiber tube 2 from FIG. 1 with a widow 3', which in an embodiment variant is designed as a planar window on both sides.

In addition, the calibration process is represented here, by means of which the exact placement of window 3' is ensured during soldering. For this purpose, a calibration mandrel 14, which is aligned at its front face 15 with the respective window 3 or 3', is inserted into the still empty fiber tube 2. In the case of window 3', then front face 15 is perpendicular to the axis of fiber tube 2, whereas in the case of wedge-shaped window 3, the front face is designed slanting correspondingly to the slanting inner surface of window 3. Calibration mandrel 14 is inserted into fiber tube 2 until it catches the not-yet-soldered window fully with its front face 15 and holds the window stable. In this position, the window may now be soldered on its peripheral edge 4 without positional deviations arising thereby.

After the soldering is completed, calibration mandrel 14 is withdrawn, and the optical inner workings as represented in FIG. 1 are mounted.

Instead of calibration mandrel 14, a stop on fiber tube 2 may be used as a structure for calibrating the window during soldering (embodiment not shown). A stop of this type may e.g. screw in and be generated by the distal end of fiber tube 2.

FIG. 1 shows shield tube 10 as a component separate from objective lens tube 5, 8 and is supported against a landing of the objective lens tube. Shield tube 10 may, however, also be fixedly connected to objective lens tube 5, 8, e.g. by screwing to end region 8, or by integral construction e.g. as an integral extension of end region 8.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE NUMERALS

1 Endoscope
2 Fiber tube
3, 3' Window
4 Edge surface
5 Objective lens tube
6 Lens
7 Lens
8 End region
9 Fiber image guide
10 Shield tube
11 Projection
12 Inner surface
13 Optical fibers
14 Calibration mandrel
15 Front face

What is claimed is:

1. A rigid endoscope comprising:
a fiber tube;
a window disposed at a the distal end of the fiber tube;
an objective lens arranged in the fiber tube;
a spacer tube to maintain the objective lens at a predetermined distance from the window; and
an objective lens tube for holding the objective lens, the objective lens tube being disposed in the fiber tube between the window and at least a portion of the spacer tube;
wherein the spacer tube is supported on a distal end against the window and on a proximal end against the objective lens.

2. The endoscope according to claim 1, wherein the spacer tube is fixedly connected to the objective lens tube.

3. The endoscope according to claim 1, wherein the spacer tube is integrally formed with the objective lens tube.

4. The endoscope according to claim 1, wherein the spacer tube is configured as a shield tube impermeable to light.

* * * * *